United States Patent
Shen et al.

(10) Patent No.: US 11,787,936 B2
(45) Date of Patent: *Oct. 17, 2023

(54) POLYURETHANE POLYMER HAVING A HARDNESS OF LESS THAN OR EQUAL TO 60 SHORE A AND GOOD ABRASION RESISTANCE

(71) Applicant: Covestro Intellectual Property GmbH & Co. KG, Leverkusen (DE)

(72) Inventors: Yi Shen, Dormagen (DE); Georg Fuchte, Leverkusen (DE); Slaven Gojsic, Zagreb (HR); Franz-Heinrich Hermanns, Grevenbroich (DE); Peter Reichert, Dormagen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 465 days.

This patent is subject to a terminal disclaimer.

(21) Appl. No.: 17/074,870

(22) Filed: Oct. 20, 2020

(65) Prior Publication Data
US 2021/0122919 A1 Apr. 29, 2021

(30) Foreign Application Priority Data
Oct. 23, 2019 (EP) .................... 19204777

(51) Int. Cl.
| | | |
|---|---|---|
| *C08G 18/16* | (2006.01) | |
| *C08L 75/06* | (2006.01) | |
| *C08G 18/12* | (2006.01) | |
| *C08G 18/32* | (2006.01) | |
| *C08G 18/42* | (2006.01) | |
| *C08G 18/48* | (2006.01) | |
| *C08G 18/73* | (2006.01) | |
| *C08G 18/76* | (2006.01) | |
| *C08K 5/00* | (2006.01) | |
| *C08L 75/08* | (2006.01) | |

(52) U.S. Cl.
CPC .............. *C08L 75/06* (2013.01); *C08G 18/12* (2013.01); *C08G 18/16* (2013.01); *C08G 18/3206* (2013.01); *C08G 18/3215* (2013.01); *C08G 18/4261* (2013.01); *C08G 18/4808* (2013.01); *C08G 18/73* (2013.01); *C08G 18/7657* (2013.01); *C08K 5/00* (2013.01); *C08L 75/08* (2013.01); *C08G 2410/00* (2013.01); *C08K 2201/019* (2013.01); *C08L 2203/30* (2013.01)

(58) Field of Classification Search
CPC .. C08G 18/10; C08G 18/4238; C08G 18/664; C08G 18/7671
See application file for complete search history.

(56) References Cited

U.S. PATENT DOCUMENTS

| | | | |
|---|---|---|---|
| 3,642,964 A | 2/1972 | Rausch, Jr. et al. | |
| 3,915,923 A | 10/1975 | Ward | |
| 3,971,720 A * | 7/1976 | Swanson | C05F 3/00 71/21 |
| 4,134,883 A * | 1/1979 | Mendelsohn | C08G 18/12 528/63 |
| 5,427,221 A * | 6/1995 | Spriggs | B66B 23/04 198/835 |
| 5,690,803 A * | 11/1997 | Castegnier | B41C 1/105 204/508 |
| 5,777,650 A * | 7/1998 | Blank | B41J 2/0057 492/56 |
| 5,795,948 A | 8/1998 | Heidingsfeld et al. | |
| 5,955,559 A * | 9/1999 | Handlin, Jr. | C08G 18/69 528/85 |
| 6,790,916 B2 | 9/2004 | Brauer et al. | |
| 2007/0049719 A1 | 3/2007 | Brauer et al. | |
| 2007/0125474 A1* | 6/2007 | Barker | B65H 37/005 156/577 |
| 2008/0097067 A1* | 4/2008 | Xie | C08G 18/664 528/73 |
| 2008/0139774 A1 | 6/2008 | Lawrey et al. | |
| 2015/0141609 A1* | 5/2015 | Lista | C08G 18/72 528/80 |

FOREIGN PATENT DOCUMENTS

| | | | | |
|---|---|---|---|---|
| CN | 101875713 A | 11/2010 | | |
| CN | 106750289 A | 5/2017 | | |
| DE | 1964834 A1 | 7/1971 | | |
| DE | 2901774 A1 | 7/1980 | | |
| DE | 19603211 A1 * | 7/1997 | ............. | B65H 18/16 |
| GB | 1057018 A | 2/1967 | | |

* cited by examiner

Primary Examiner — Michael M Dollinger
(74) Attorney, Agent, or Firm — THE WEBB LAW FIRM

(57) ABSTRACT

The present invention relates to a novel thermoplastically processible polyurethane polymer having a hardness of ≤60 Shore A, to compositions containing this polyurethane polymer, to the uses thereof and to articles containing this polyurethane polymer.

18 Claims, No Drawings

POLYURETHANE POLYMER HAVING A HARDNESS OF LESS THAN OR EQUAL TO 60 SHORE A AND GOOD ABRASION RESISTANCE

CROSS-REFERENCE TO RELATED APPLICATION

This application claims the benefit of European Application No. 19204777, filed Oct. 23, 2019, which is incorporated herein by reference.

The present invention relates to a novel thermoplastically processible polyurethane polymer having a hardness of ≤60 Shore A, to compositions containing this polyurethane polymer, to the uses thereof and to articles containing this polyurethane polymer.

BACKGROUND

Thermoplastically processible polyurethane polymers (TPU) have long been known. They are of great industrial importance due to the combination of high-level mechanical properties with the known advantages of cost-effective thermoplastic processibility. The use of different chemical building block components makes it possible to achieve a great breadth of variation in mechanical properties. An overview of TPU, their properties and applications is described for example in Kunststoffe 68 (1978), pages 819 to 825, or Kautschuk, Gummi, Kunststoffe 35 (1982), pages 568 to 584. TPUs are formed from linear polyols, usually polyethers or polyesters, organic diisocyanates and short-chain diols (chain extenders). TPUs can be prepared continuously or batchwise. The best-known industrial production processes which are also in use industrially are the belt process (GB 1057018 A) and the extruder process (DE 1964834 A-1 and DE 2059570 A-1).

To adjust the properties, the building block components can be varied within relatively broad molar ratios. Molar ratios of macrodiols to chain extenders of from 1:1 to 1:12 have proven useful. The hardness of the TPU can be adjusted within a wide range via the amount of chain extender. This results in products in the hardness range from approx. 40 Shore A to approx. 85 Shore D.

For the improvement of the processing behaviour, in particular the cycle time, of particular interest over the entire hardness range from approx. 40 Shore A to approx. 85 Shore D are those TPUs which in injection-moulded articles have a very high solidification rate after processing. In particular in the case of hard TPUs and soft TPUs, there are frequently problems with the chemical coupling of the hard and soft segment on account of excessively high differences in polarity between these phases. As a result, the overall potential of the mechanical properties and the processing properties can frequently not be fully exploited. There has been no shortage of attempts to eliminate these disadvantages by specific methods.

A process for preparing thermoplastically processible polyurethanes is described by W. Bräuer et al. (EP-A 1757632). The homogeneity of the TPUs is improved by a multistage OH-prepolymer process. However, the improved homogeneity slows the solidification rate of the TPUs.

A process for preparing soft, readily demouldable thermoplastic polyurethane elastomers having low shrinkage is described by W. Bräuer et al. (EP-A 1338614). By pre-extending the soft segment, the demoulding behaviour of TPUs between 45 Shore A and 65 Shore A was improved. At very high hardnesses this process has clear disadvantages because incompatibilities between the hard and soft phase arise and hence good coupling between these phases can no longer take place. As a result, the high molecular weight of the TPUs which is required for good mechanical properties is not achieved. In practice, this process is also very unstable as a result of excessively high and fluctuating viscosities of the prepolymer stage and below 60 Shore A no longer functions satisfactorily, meaning extruder downtimes frequently occur.

Further soft thermoplastic polyurethane elastomers, a process for the preparation thereof and use are likewise described by W. Bräuer et al. (EP-A 1932863). Via the combination of different polyester polyols and chain extenders, TPUs having good demouldability were obtained. However, this document does not describe any TPUs based on polyethers. In the case of plasticizer-free TPUs of this process having a hardness of less than 60 Shore A, only a very slow solidification after the processing by injection moulding has been achieved to date.

Due to the broad scope for application of TPUs and in particular soft TPUs, that is to say TPUs having a Shore hardness of 60 Shore A, there is a great need to produce appropriately tailored soft TPUs. There is also a need for compositions of soft TPUs which do not contain any plasticizer and yet which in spite of this are elastically and mechanically durable.

SUMMARY

It was therefore an object of the invention to provide a novel thermoplastically processible polyurethane polymer having a hardness of ≤60 Shore A and having good processing properties and good mechanical properties. It was additionally an object of the invention to provide a plasticizer-free composition of a thermoplastically processible polyurethane polymer having a hardness of ≤60 Shore A.

This object has surprisingly been achieved by a thermoplastically processible polyurethane polymer having a hardness of ≤60 Shore A, obtainable or obtained by reacting the following components (A) one or more essentially linear polyether polyols and/or polyester polyols, where the total amount of component (A) has an average molecular weight Mn in the range from 500 g/mol to 5000 g/mol, Mn having been calculated from the OH number determined according to DIN53240, (B) one or more diisocyanates selected from the group consisting of 2-methyl-1,5-diisocyanatopentane, 1,4-diisocyanatobutane (BDI), 1,5-diisocyanatopentane (PDI), 1,6-diisocyanatohexane (HDI), 2,2,4-trimethyl-1,6-diisocyanatohexane, 2,4,4-trimethyl-1,6-diisocyanatohexane or diphenylmethane diisocyanate isomer mixtures having a diphenylmethane 4,4'-diisocyanate content of >96% by weight, (C) one or more linear diols having a molecular weight of 62 g/mol to 500 g/mol, (D) optionally in the presence of one or more catalysts, (E) optionally in the presence of one or more additives, auxiliaries and/or additions, and (F) optionally in the presence of one or more monofunctional chain terminators, characterized in that the reaction of the components is effected in a solvent-free fashion and comprises or consists of the following steps:

1) providing and reacting a mixture made up of the total amount of component (A), a portion of component (B) and optionally a portion or the total amount of component (D), component (E) and/or component (F), to give an NCO-functional prepolymer, where in process step 1) there is a molar ratio of component (B) to component (A) of in the range from 1.1:1.0 to 5.0:1.0, 2) reacting the NCO-functional prepolymer from process step 1) with the total amount of component (C) to obtain an OH-functional prepolymer, possibly in the presence of a further portion of component (D), component (E) and/or component (F), 3) reacting the OH-functional prepolymer from process step 2) with the remaining amount of component (B) and any remaining amount of component (D), component (E) and/or component (F) to obtain the thermoplastically processible polyurethane, where during all process steps there is a molar ratio of component (B) to the sum total of component (A) and component (C) of in the range from 0.9:1.0 to 1.2:1.0.

The Shore hardness was determined in accordance with DIN ISO 7619-1 (2012-02-01).

DETAILED DESCRIPTION

The polyurethane polymers according to the invention have better properties than those which have been prepared by processes known from the prior art. In particular, the polyurethane polymers according to the invention harden more rapidly and have a higher abrasion resistance, high mechanical damping (tan δ) and an improved tensile strength.

The word "a" in the context of the present invention in connection with countable parameters is to be understood as meaning the number "one" only when this is stated explicitly (for instance by the expression "precisely one"). When reference is made hereinbelow for example to "a polyol" the word "a" is to be understood as meaning merely the indefinite article and not the number "one", this therefore also encompasses an embodiment comprising a mixture of at least two polyols.

Within this context, "essentially" means that at least 95 mol %, preferably at least 98 mol %, particularly preferably at least 99 mol % and even more preferably at least 99.5 mol %, even more preferably still at least 99.8 mol % and most preferably 100 mol % of the total amount of the polyols of component A) consist of linear polyols.

"Solvent-free" in the context of the present invention is understood to mean the reaction of components A, B and C essentially without additional diluents, for example organic solvents or water, meaning that components A, B and C are preferably reacted with one another in undiluted form. Components D, E and/or F may optionally be present in suitable diluents and be added as a solution to components A, B and/or C. In the context of the present invention, the process is still considered to be solvent-free when the solvent content is up to 1% by weight, preferably up to 0.1% by weight, even more preferably up to 0.01% by weight and most preferably 0% by weight, based on the total weight of the reaction mixture. A solvent is understood to mean a substance in which at least one of components A, B and C and optionally D, E and/or F can be dissolved, dispersed, suspended or emulsified, but which does not react with any of components A, B and C and optionally D, E and/or F or with the polymer and the prepolymer(s). Within this context, "essentially" means that the proportion of solvent is at most 10% by weight, preferably at most 5% by weight, particularly preferably at most 1% by weight, even more preferably at most 0.1% by weight, even more preferably still at most 0.01% by weight and most preferably 0% by weight, based on the total weight of the reaction mixture.

According to the invention the terms "comprising" or "containing" preferably mean "consisting essentially of" and particularly preferably mean "consisting of".

The hardness of the thermoplastically processible polyurethanes can be adjusted from 35 Shore A to 60 Shore A by selecting the molar ratio of component A) to component C).

The amounts of the reaction components for the NCO-functional prepolymer formation in step 1) are selected such that the NCO/OH ratio of polyisocyanate to polyol in step 1) is from 1.1:1 to 5.0:1.

The components are intimately mixed and the NCO prepolymer reaction in step 1) is preferably brought to complete conversion (based on the polyol component).

At least component (C) is then mixed in as chain extender (step 2) to afford an OH-functional prepolymer.

Thereafter, in step 3), the remaining amount of component (B) is added, an NCO/OH ratio of from 0.9:1 to 1.2:1 being maintained. Preferably, the same component (B) is used in step 3) as in step 1).

In a preferred embodiment of the thermoplastically processible polyurethane according to the invention, in process step 2) there is a molar ratio of NCO-functional prepolymer to component (C) of less than 1.0. Component (C) is thus present in a molar excess.

Suitable components (A) are all essentially linear polyester polyols and/or polyether polyols known to those skilled in the art and having an average molecular weight Mn of greater than 500 g/mol. According to the invention, the total amount of component A has an average molecular weight Mn in the range from 500 g/mol to 5000 g/mol, Mn having been calculated from the OH number determined according to DIN53240. It is thus possible that some of the polyols have an Mn of greater than 5000 g/mol, provided that the Mn of the total amount of component A is in the range from 500 g/mol to 5000 g/mol. The molecular weights Mn of such polyols are typically calculated via their OH number (hydroxyl number), as is known to those skilled in the art. The OH number is determined titrimetrically in accordance with DIN 53240. The molar weight of polyols can be calculated from the OH number (OHN) by the following formula:

$$Mn = 1000 \text{ mg/g} \cdot \frac{z \cdot 56.106 \text{ g/Mol}}{OHN[\text{mg/g}]}$$

Here, z is the number of OH groups in the macromolecule, For a linear diol, z=2. For production reasons, these often contain small amounts of nonlinear compounds.

Suitable polyester diols a) can be prepared, for example, from dicarboxylic acids having 2 to 12 carbon atoms, preferably 2 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid, dodecanedioic acid and aromatic dicarboxylic acids such as phthalic acid, isophthalic acid and terephthalic acid. The dicarboxylic acids may be used individually or as mixtures, for example in the form of a succinic, glutaric and adipic acid mixture. For preparation of the polyester polyols, it may in some cases be advantageous to use, rather than the dicarboxylic acids, the corresponding dicarboxylic acid derivatives such as carboxylic diesters having 1 to 4 carbon atoms in the alcohol radical, carboxylic anhydrides or acyl chlorides. Examples of polyhydric alcohols are glycols having 2 to 12 and preferably 2 to 6 carbon atoms, such as ethylene glycol, diethylene glycol, butane-1,4-diol, pentane-1,5-diol, hexane-1,6-diol, decane-1,10-diol, dodecane-1,12-diol, 2,2-dimethylpropane-1,3-diol, propane-1,3-diol, propane-1,2-diol and dipropylene glycol. Depending on the desired properties, the polyhydric alcohols may be used alone or optionally in a mixture with one another. Furthermore suitable are condensation products of hydroxycarboxylic acids, for example hydroxycaproic acid, and polymerization products of lactones, for example optionally substituted caprolactones. Polyester polyols used with preference are ethanediol polyadipates, butane-1,4-diol polyadipates, hexane-1,6-diol polyadipates, ethanediol butane-1,4-diol polyadipates, hexane-1,6-diol neopentyl glycol polyadipates, hexane-1,6-diol butane-1,4-diol polyadipates and polycaprolactones. The polyester diols have molecular weights Mn in the range from 500 to 5000 g/mol, preferably in the range from 600 to 3500 g/mol and particularly preferably in the range from 800 to 3000 g/mol. They may be used individually or in the form of mixtures with one another, Mn being calculated from the OH number determined according to DIN53240.

Suitable polyether diols b) may be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides can be used individually, alternately in succession or as mixtures. Examples of useful starter molecules include: water, amino alcohols such as N-alkyldiethanolamines, for example N-methyldiethanolamine, and diols such as ethylene glycol, 1,3-propylene glycol, butane-1,4-diol and hexane-1,6-diol. It is also optionally possible to use mixtures of starter molecules. Other suitable polyether diols are the hydroxyl group-containing polymerization products of tetrahydrofuran. It is also possible to use trifunctional polyethers in proportions of 0 to 30% by weight based on the bifunctional polyethers but at most in an amount such that a thermoplastically processible product is formed. Suitable polyether diols have a number-average molecular weight Mn in the range from 500 to 5000 g/mol, preferably in the range from 750 to 5000 g/mol and very particularly preferably in the range from 900 to 4200 g/mol. They may be used either individually or in the form of mixtures with one another, Mn being calculated from the OH number determined according to DIN53240.

In a further preferred embodiment of the thermoplastically processible polyurethane according to the invention, components A used are polyester diols having a melting temperature of ≤50° C., polyether polyols and/or mixtures of at least 2 of these, preferably components A used are polyether polyols, particularly preferably polyethylene diol ethers, polypropylene diol ethers, polytetramethylene glycol and/or mixtures of at least 2 of these, more preferably polypropylene diol ethers.

In a further preferred embodiment of the thermoplastically processible polyurethane according to the invention, the polyether polyols have a number-average molecular weight Mn in the range from 750 to 5000 g/mol and preferably in the range from 900 to 4200 g/mol, Mn having been calculated from the OH number determined according to DIN53240.

In a further preferred embodiment of the thermoplastically processible polyurethane according to the invention, components (A) used are one or more polyester diols having a number-average molecular weight Mn in the range from 500 g/mol to 5000 g/mol, preferably in the range from 600 g/mol to 3500 g/mol and particularly preferably in the range from 800 g/mol to 3000 g/mol, Mn having been calculated from the OH number determined according to DIN53240.

In a further preferred embodiment of the thermoplastically processible polyurethane according to the invention, components (A) used are one or more polyether diols having a number-average molecular weight Mn in the range from 500 g/mol to 5000 g/mol, preferably in the range from 750 g/mol to 5000 g/mol and particularly preferably in the range from 900 g/mol to 4200 g/mol, Mn having been calculated from the OH number determined according to DIN53240.

In a further preferred embodiment of the thermoplastically processible polyurethane according to the invention, the one or more polyether diols are independently of one another polyethers based on a polymer of ethylene oxide or propylene oxide or a mixture of different polymers of these raw materials.

In a further preferred embodiment of the thermoplastically processible polyurethane according to the invention, the one or more polyether diols are independently of one another polyethers based on a polymer of tetrahydrofuran.

For the diisocyanates used as component (B), it is unimportant whether the diisocyanates have been obtained by means of phosgenation or by a phosgene-free process. The diisocyanates and/or the precursor compounds of these may have been obtained from fossil or biological sources. Preference is given to preparing 1,6-diisocyanatohexane (HDI) from hexamethylene-1,6-diamine and 1,5-diisocyanatopentane from pentamethylene-1,5-diamine, the hexamethylene-1,6-diamine and the pentamethylene-1,5-diamine having been obtained from biological sources, preferably by bacterial fermentation.

In a further preferred embodiment of the thermoplastically processible polyurethane according to the invention, components (B) used are 2-methyl-1,5-diisocyanatopentane, 1,6-diisocyanatohexane (HDI), 2,2,4-trimethyl-1,6-diisocyanatohexane, diphenylmethane diisocyanate isomer mixtures having a diphenylmethane 4,4'-diisocyanate content of >96% by weight and/or mixtures of at least 2 of these, preference being given to using diphenylmethane diisocyanate isomer mixtures having a diphenylmethane 4,4'-diisocyanate content of >96% by weight and particular preference being given to using diphenylmethane 4,4'-diisocyanate.

In a further preferred embodiment of the thermoplastically processible polyurethane according to the invention, the component (B) used is a diphenylmethane diisocyanate isomer mixture having a diphenylmethane 4,4'-diisocyanate content of greater than 96% by weight, based on the total weight of component (B); the component (B) used is preferably diphenylmethane 4,4'-diisocyanate.

In a further preferred embodiment of the thermoplastically processible polyurethane according to the invention, the component (B) used is hexamethylene 1,6-diisocyanate.

Suitable components (C) (chain extender) are all linear diols known to those skilled in the art and having a molecular weight of 62 g/mol to 500 g/mol. The diols and/or the precursor compounds of these may have been obtained from fossil or biological sources. Suitable diols are preferably aliphatic diols having 2 to 14 carbon atoms, such as for example ethanediol, butane-1,4-diol, hexane-1,6-diol, octane-1,8-diol, decane-1,10-diol, dodecane-1,12-diol, diethylene glycol and dipropylene glycol. However, also suitable are diesters of terephthalic acid with glycols having 2 to 4 carbon atoms, such as for example terephthalic acid bis-ethylene glycol or terephthalic acid bis-butane-1,4-diol, hydroxyalkylene ethers of hydroquinone, such as for example 1,4-di(hydroxyethyl)hydroquinone and ethoxylated bisphenols. Particular preference is given to using ethanediol, butane-1,4-diol, hexane-1,6-diol and 1,4-di(hydroxyethyl)hydroquinone as short-chain diols. Mixtures of the abovementioned chain extenders may also be used. It is also possible to add small quantities of diamines and/or triols.

In a further preferred embodiment of the thermoplastically processable polyurethane according to the invention, components (C) used are ethane-1,2-diol, butane-1,4-diol, hexane-1,6-diol, 1,4-di(hydroxyethyl)hydroquinone, cyclobutane-1,3-diol and/or mixtures of at least 2 of these, preference being given to using ethane-1,2-diol, butane-1,4-diol, hexane-1,6-diol and/or mixtures of at least 2 of these, particular preference being given to using ethane-1,2-diol, butane-1,4-diol and/or mixtures of these.

In a further preferred embodiment of the thermoplastically processable polyurethane according to the invention, components (C) used are one or more diols selected from the group consisting of ethane-1,2-diol, butane-1,4-diol, hexane-1,6-diol, 1,4-di(beta-hydroxyethyl)hydroquinone or a mixture of at least two of these, components (C) used preferably being ethane-1,2-diol, butane-1,4-diol or mixtures of these and the component (C) used particularly preferably being ethane-1,2-diol.

Catalysts (D) that may be used include the customary catalysts known from polyurethane chemistry. Suitable catalysts are the customary tertiary amines known per se, for example triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organic metal compounds such as titanic esters, iron compounds, bismuth compounds, zirconium compounds, tin compounds, for example tin diacetate, tin dioctoate, tin dilaurate or the dialkyltin salts of aliphatic carboxylic acids such as dibutyltin diacetate, dibutyltin dilaurate or the like. Preferred catalysts are organic metal compounds, in particular titanic esters, iron compounds or tin compounds. Very particular preference is given to dibutyltin dilaurate, tin dioctoate and titanic esters.

Additives, auxiliaries and additions (E) that may be used are for example lubricants, such as fatty acid esters, metal soaps thereof, fatty acid amides and silicone compounds, antiblocking agents, inhibitors, stabilizers against hydrolysis, light, heat and discolouration, flame retardants, dyes, pigments, inorganic or organic fillers, nucleating agents and reinforcers. Reinforcers are especially fibrous reinforcing materials such as inorganic fibres which are produced according to the prior art and may also be sized. Further information about the recited auxiliary and additive substances may be found in the specialist literature, for example J. H. Saunders, K. C. Frisch: "High Polymers", volume XVI, Polyurethane, part 1 and 2, Interscience Publishers 1962 and 1964, R. Gächter, H. Müller (Ed.): Taschenbuch der Kunststoff-Additive, 3rd edition, Hanser Verlag, Munich 1989, or DE-A 29 01 774.

Monofunctional chain terminators (F) which may be used include monoalcohols, such as for example 1-butanol, 1-hexanol, 1-octanol and stearyl alcohol, or monoamines, such as for example 1-butylamine, di-n-butylamine and stearylamine, to set a particular TPU molecular weight.

In a further preferred embodiment of the thermoplastically processable polyurethane according to the invention, the thermoplastically processable polyurethane polymer has a hardness in the range from 35 Shore A to 60 Shore A, preferably in the range from 40 Shore A to 60 Shore A, particularly preferably in the range from 40 Shore A to 55 Shore A, in each case determined in accordance with DIN ISO 7619-1 (2012-02-01).

In a further preferred embodiment of the thermoplastically processable polyurethane according to the invention, the thermoplastically processable polyurethane polymer has a tan δ of ≥0.20 in the range from 0° C. to 20° C., tan δ having been determined according to DIN EN ISO 6721-1: 2011. The thermoplastically processable polyurethane polymer preferably has a tan δ at 0° C. of in the range from 0.20 to 0.40, particularly preferably in the range from 0.30 to 0.40, tan δ having been determined according to DIN EN ISO 6721-1:2011. The thermoplastically processable polyurethane polymer preferably has a tan δ at 20° C. of in the range from 0.20 to 0.26, particularly preferably in the range from 0.21 to 0.25, tan δ having been determined according to DIN EN ISO 6721-1:2011.

The thermoplastically processable polyurethanes having a hardness of from 40 Shore A to 60 Shore A according to the invention are particularly preferably prepared from the following main components:

Component (A):
i) butane-1,4-diol polyadipates, hexane-1,6-diol polyadipates, ethanediol butane-1,4-diol polyadipates, hexane-1,6-diol neopentyl glycol polyadipates, hexane-1,6-diol butane-1,4-diol polyadipates and mixtures of these having molecular weights Mn in the range from 500 to 5000 g/mol, Mn having been calculated from the OH number determined according to DIN53240, or
ii) polypropylene oxides or polyethylene/polypropylene oxides and/or polymers of tetrahydrofuran and mixtures of these having molecular weights Mn in the range from 500 to 5000 g/mol, Mn having been calculated from the OH number determined according to DIN53240, Component (B):
iii) diphenylmethane 4,4'-diisocyanate, dicyclohexylmethane 4,4'-diisocyanate and/or hexamethylene 1,6-diisocyanate, Component (C):
iv) ethanediol, butane-1,4-diol, hexane-1,6-diol and/or 1,4-di(hydroxyethyl)hydroquinone,
where mixtures of components within i) to iv) and also among i) and ii) may also be used.

The thermoplastically processable polyurethane polymer according to the invention can be prepared batchwise or continuously by the process according to the invention. The best-known industrial production processes for the preparation of TPU are the belt process (GB-A 1 057018) and the extruder process (DE-A 1 964 834, DE-A2 059570 and U.S. Pat. No. 5,795,948).

Known mixing units, preferably those operating with a high shear energy, are suitable for the preparation of the thermoplastically processable polyurethane polymer according to the invention. For continuous preparation, mention may be made by way of example of co-kneaders, preferably extruders, such as for example twin-screw extruders and Buss kneaders.

The thermoplastically processable polyurethane polymer according to the invention may for example be prepared on a twin-screw extruder by preparing the prepolymer in the first section of the extruder and following this with the chain extension and addition of polyisocyanate in the second section. According to the invention, the metered addition of the chain extender (component (C)) has to be effected prior to the metered addition of the further polyisocyanate. The chain extender and polyisocyanate must not be added in parallel into the same metering opening of the extruder.

However, the NCO and OH prepolymer may also be prepared outside of the extruder in a separate upstream prepolymer reactor, batchwise in a tank or continuously in a tube with static mixers or a stirred tube (tubular mixer).

However, an OH prepolymer prepared in a separate prepolymer reactor may also be mixed with the diisocyanate by means of a first mixing apparatus, for example a static mixer, and with the remaining amounts of polyisocyanates by means of a second mixing apparatus, for example a mixing head. Analogously to the known belt process, this reaction mixture is subsequently continuously applied to a carrier, for example a conveyor belt, where it is allowed to react until solidification of the material, possibly with heating of the belt, to afford the TPU.

In a preferred embodiment, the process is conducted at a reaction temperature in the range from 140° C. to 240° C. In a further preferred embodiment, the process is conducted in an extruder at a reaction temperature in the range from 140° C. to 240° C.

The invention further provides a plasticizer-free composition containing at least one thermoplastically processible polyurethane polymer according to the invention and an additive.

It is also possible inter alia to provide a composition with the thermoplastically processible polyurethanes according to the invention, without the use of plasticizers, which possess a rapid solidification rate after processing by injection moulding.

On account of the good mechanical properties, such as high mechanical damping (tan δ) and the good abrasion resistance, the thermoplastically processible polyurethane polymers according to the invention or the plasticizer-free composition according to the invention is/are very well suited to applications in which the material is exposed to mechanical loading, as is the case for example in the case of rollers, wheels, shoe soles, elastic bearing elements and/or elastic connecting elements.

The invention further provides for the use of a thermoplastically processible polyurethane polymer having a hardness of ≤60 Shore A according to the invention or of a plasticizer-free composition according to the invention for the production of rollers and/or wheels.

In a preferred embodiment, the rollers and/or the wheels are parts of transport containers, suitcases, sports bags, leisure bags, panniers, furniture, medical devices, hospital beds, shopping trolleys, lifts and/or escalators.

In a preferred embodiment, the rollers and/or the wheels are drive rollers and/or pressure rollers.

The invention further provides a roller and/or a wheel comprising or containing at least one thermoplastically processible polyurethane polymer having a hardness of ≤60 Shore A according to the invention or a plasticizer-free composition according to the invention.

In a preferred embodiment, the roller and/or the wheel are parts of transport containers, suitcases, sports bags, leisure bags, panniers, furniture, medical devices, hospital beds, shopping trolleys, lifts and/or escalators.

In a preferred embodiment, the roller and/or the wheel is a drive roller.

Transport containers may for example be mobile pedestals, large containers, trolleys, small load carriers.

The invention further provides for the use of a thermoplastically processible polyurethane polymer having a hardness of ≤60 Shore A according to the invention or of a plasticizer-free composition according to the invention for the production of shoe soles.

The invention further provides for the use of a thermoplastically processible polyurethane polymer having a hardness of ≤60 Shore A according to the invention or of a plasticizer-free composition according to the invention for the production of shoe soles, wherein the shoe sole is not a synthetic leather shoe sole.

In a preferred embodiment, the shoe soles are shoe outsoles, preferably shoe outsoles for sports shoes and/or casual shoes.

The invention further provides a shoe sole comprising or containing at least one thermoplastically processible polyurethane polymer having a hardness of ≤60 Shore A according to the invention or a plasticizer-free composition according to the invention.

The invention further provides a shoe sole comprising or containing at least one thermoplastically processible polyurethane polymer having a hardness of ≤60 Shore A according to the invention or a plasticizer-free composition according to the invention, wherein the shoe sole is not a synthetic leather shoe sole.

In a preferred embodiment, the shoe sole is a shoe outsole, preferably a shoe outsole for sports shoes and/or casual shoes.

The invention further provides for the use of a thermoplastically processible polyurethane polymer having a hardness of ≤60 Shore A according to the invention or of a plasticizer-free composition according to the invention for the production of elastic bearing elements and/or elastic connecting elements, preferably for the production of elastic bearing elements and/or elastic connecting elements for automobiles.

The invention further provides for the use of a thermoplastically processible polyurethane polymer having a hardness of ≤60 Shore A according to the invention or of a plasticizer-free composition according to the invention for the production of elastic bearing elements and/or elastic connecting elements, preferably for the production of elastic bearing elements and/or elastic connecting elements for automobiles, wherein the elastic bearing element and/or the elastic connecting element does not contain or comprise any synthetic leather made from the thermoplastically processible polyurethane polymer having a hardness of ≤60 Shore A according to the invention or from the plasticizer-free composition according to the invention.

In a preferred embodiment, the elastic bearing elements and/or elastic connecting elements are damper bearings, spring seats, door stop dampers and/or bearing sleeves.

The invention further provides an elastic bearing element and/or elastic connecting element comprising or containing at least one thermoplastically processible polyurethane polymer having a hardness of ≤60 Shore A according to the invention or a plasticizer-free composition according to the invention.

The invention further provides an elastic bearing element and/or elastic connecting element comprising or containing at least one thermoplastically processible polyurethane polymer having a hardness of ≤60 Shore A according to the invention or a plasticizer-free composition according to the invention, wherein the elastic bearing element and/or the elastic connecting element does not contain or comprise any synthetic leather made from the thermoplastically processible polyurethane polymer having a hardness of ≤60 Shore A according to the invention or from the plasticizer-free composition according to the invention.

In a preferred embodiment, the elastic bearing element and/or the elastic connecting element is a damper bearing, a spring seat, a door stop damper, a bearing sleeve.

The invention further provides for the use of a thermoplastically processible polyurethane polymer having a hardness of ≤60 Shore A according to the invention or of a plasticizer-free composition according to the invention for the production of components for automobile interiors.

The invention further provides for the use of a thermoplastically processible polyurethane polymer having a hardness of ≤60 Shore A according to the invention or of a plasticizer-free composition according to the invention for the production of components for automobile interiors, wherein the components for automobile interiors are not synthetic leather.

In a preferred embodiment, the components for automobile interiors are parts of roller blinds, sliding covers, louvre shutters, cupholders, gearshift covers, storage compartments, door handles, charging cradles, anti-slip mats, injection-moulded gaiters, blow-moulded gaiters, flexible seals, rotary switches, pushbutton switches and/or door stops.

The invention further provides a component for automobile interiors, comprising or containing at least one thermoplastically processible polyurethane polymer having a hardness of ≤60 Shore A according to the invention or a plasticizer-free composition according to the invention.

The invention further provides a component for automobile interiors, comprising or containing at least one thermoplastically processible polyurethane polymer having a hardness of ≤60 Shore A according to the invention or a plasticizer-free composition according to the invention, wherein the component for automobile interiors is not synthetic leather.

In a preferred embodiment, the component for automobile interiors is part of roller blinds, sliding covers, louvre shutters, cupholders, gearshift covers, storage compartments, door handles, charging cradles, anti-slip mats, injection-moulded gaiters, blow-moulded gaiters, flexible seals, rotary switches, pushbutton switches and/or door stops.

The invention shall be elucidated in more detail by the examples which follow, but without being restricted hereto.

Test Methods:

Tensile Test:

Measurements in the tensile test in accordance with ISO 53504 (2009-10) at a pulling rate of 200 mm/min.

Shore Hardness:

The Shore hardness was measured in accordance with DIN ISO 7619-1 (2012-02-01).

Solidification Rate (Hardness at 0 s/60 s)

To determine the solidification rate, the development of hardness of round mouldings (diameter 30 mm, height 6 mm) was measured after processing by injection moulding (injection moulding machine settings: 25 s cooling time and 25 s pressure dwell time). Here, the hardness of the test specimens was measured in accordance with DIN 7619-1 (2012-02-01) immediately after removal from the mould (0 s) and after 60 s.

Abrasion Resistance:

Abrasion resistance was determined in accordance with ISO 4649:2014-03.

Compression Set:

Compression set is determined in accordance with DIN EN ISO 815-1 09/2010.

Ageing Test:

The rods produced in accordance with ISO 53504 (2009-10) were each stored in a climate-controlled cabinet at 80° C. or 110° C. at 95% atmospheric humidity. After 28 days and 49 days, the tensile strength was measured and the values obtained for the tensile strength were compared (tensile strength with storage (ageing) vs. tensile strength without storage (ageing)).

Solution Viscosity:

The TPU specimen is dissolved in a 0.4% solution of N-methylpyrrolidone +0.1% dibutylamine at room temperature with stirring. At the same time, what is known as a blank sample, consisting of N-methylpyrrolidone and 0.1% dibutylamine solution but without the TPU, is also prepared. The solutions are left to stand overnight and measured the next day. The solutions were briefly stirred once more and subsequently measured at 25° C. using an SVM3000/G2 Stabinger viscometer. The kinematic viscosity of the blank value and of the solutions is measured.

Raw Materials Used:

Polyol 1=Acclaim®2200N (commercial product from Covestro Deutschland AG, polypropylene diol ether, molecular weight Mn approx. 2000 g/mol).

BDO=butane-1,4-diol (BDO, purity ≥99% by weight) was sourced from Ashland.

MEG=ethane-1,2-diol (MEG, purity ≥99% by weight) was sourced from OQEMA AG.

MDI=diphenylmethane 4,4'-diisocyanate (MDI, purity ≥99% by weight) was sourced from Covestro AG.

Irganox® 1010 was sourced from BASF SE (DE).

2-Butanone (purity ≥99.5%) was sourced from Merck KGaA (DE).

Tyzor® AA105 was sourced from Dorf Ketal (US).

Polyether LP 112 was sourced from Covestro AG (polypropylene diol ether, molecular weight Mn approx. 1000 g/mol).

EXAMPLES

Table 1 illustrates the invention on the basis of a few examples. The preparation processes used are described hereinbelow.

Process 1*: Soft Segment Pre-Extension (in Accordance with EP-A 1338614), not According to the Invention Step 1: Portion 1 of the MDI is brought to conversion of >90 mol %, based on the polyol, with 1 mol of polyol or polyol mixture with stirring at approx. 140° C.

Step 2: Portion 2 of the MDI and then the chain extender are added to the stirred reaction mixture, after vigorous mixing (approx. 20 s), the reaction mixture is cast onto a metal sheet and subsequently heat treated for 30 minutes at 120° C.

Process 2: MDI Multistage Pre-Extension Process According to the Invention

Step 1: Portion 1 of the MDI is brought to conversion of >90 mol %, based on the polyol, with 1 mol of polyol or polyol mixture with stirring at approx. 140° C.

Step 2: The chain extender is added to the stirred reaction mixture and this is stirred vigorously for approx. 10 s.

Step 3: Portion 2 of the MDI is added to the stirred reaction mixture. The reaction mixture is stirred for a further 20 s, subsequently cast onto a metal sheet and heat-treated for 30 minutes at 120° C.

The cast TPU slabs obtained were cut and pelletized. The pellets were processed using an Arburg Allrounder 470S injection-moulding machine in a temperature range from 180° to 230° C. and in a pressure range from 650 to 750 bar at an injection rate of from 10 to 35 cm$^3$/s to give bars (mould temperature: 40° C.; bar size: 80×10×4 mm) or slabs (mould temperature: 40° C.; size: 125×50×2 mm).

From the TPU products produced, the mechanical values (100% modulus, 300% modulus, tear strength, elongation at break and Shore A/D hardness), the solidification rate, the abrasion resistance and the compression set were determined and the ageing resistance ascertained.

TABLE 1

Comparative examples 1 and 4, examples 2, 3, 5, 6 and 7: Measurement results of soft TPUs

| Experiment number | Process | Polyol | Chain extender | MDI/ portion 1 [mol] | MDI/ portion 2 [mol] | Theoretical hardness# | Hardness [Shore] | 100% modulus [MPa] | Tensile strength [MPa] | Hardness at 0s/60s [Shore A] |
|---|---|---|---|---|---|---|---|---|---|---|
| 1* | 1 | 1 | MEG | 1.5 | 0.539 | 12 | 42A | 2.4 | 15.3 | 19/25 |
| 2 | 2 | 1 | MEG | 1.5 | 0.539 | 12 | 47A | 1.5 | 15.1 | 26/33 |
| 3 | 2 | 1 | MEG | 1.5 | 1.642 | 22.4 | 60A | 4.3 | 14.4 | 39/43 |
| 4* | 1 | 1 | MEG | 1.3 | 0.739 | 12 | 40A | 1.1 | 9.8 | 11/18 |
| 5 | 2 | 1 | MEG | 1.3 | 0.739 | 12 | 49A | 1.9 | 11.8 | 30/34 |
| 6 | 2 | 1 | MEG | 2 | 0.373 | 16 | 55A | 2.1 | 12 | 35/48 |
| 7 | 2 | 1 | BDO | 2 | 0.255 | 16 | 59A | 1.6 | 14.9 | 20/45 |

*Comparative example not according to the invention, #The theoretical hardness is the proportion of the hard segments of the TPU: e.g. TH = n(BDO + MDI)/(n(BDO + MDI) + m(Polyol + MDI))

TABLE 2

Comparative example 1 and inventive examples 2, 3 and 6 Measurement results of the determination of abrasion resistance, of the determination of compression set and of the ageing test.

| Experiment number | Abrasion resistance [mm³] | Compression set | | | Tensile strength [MPa] 0 Days | Ageing test at 80° C. tensile strength [MPa] 28 Days | Ageing test at 110° C. tensile strength [MPA] 28 Days |
|---|---|---|---|---|---|---|---|
| | | Method A 24 h/70° C. | Method C 24 h/70° C. | 72 h/23° C. | | | |
| 1* | 224 | 30 | 24 | 14 | | | |
| 2 | 96 | 21.4 | 16.7 | 8.9 | | | |
| 3 | 38 | 22 | | 12 | 14.4 | 11.1 | 10.1 |
| 6 | 46 | 33 | | 14 | 12 | 11.6 | 7.2 |

*Comparative example not according to the invention

In the examples listed in Table 1 (Experiments 1, 2, 4 and 5), which were produced from the same raw materials and with the same theoretical hardness by different processes, it can be clearly seen that the TPU materials which were produced by the multistage process according to the invention (Process 2) solidify much more quickly, that is to say the hardness measured after 0 seconds and also after 60 seconds after removal from the injection moulding machine is higher than in the respective comparative experiments. It is clearly apparent for Experiments 6 and 7 that the TPUs based on monoethylene glycol (MEG) solidify more rapidly than those based on butane-1,4-diol (BDO).

The examples listed in Table 2 correspond to the respective examples from Table 1. It is clearly apparent that the abrasion resistance of Examples 2, 3 and 6 according to the invention is significantly lower than in Comparative Example 1. The examples according to the invention also exhibit markedly better values for the determination of the compression set. It can be seen from Examples 3 and 6 according to the invention that the polyurethanes according to the invention have good ageing resistance.

Comparative Example with Addition of Solvent and Example According to the Invention without Addition of Solvent For Comparative Example 8, the polyol used was Acclaim® Polyether 2200N (polyol 1) and the procedure was in accordance with the experiment description in U.S. Pat. No. 3,915,923. The resulting products were then compared with Example 6 according to the invention, which was produced according to Process 2 according to the invention. For this, the same theoretical hardnesses were set in each case.

Experiment 8:

260 g of Acclaim® 2200N (OH number 56.1, corresponding to 1 mol) and 1.3 g of Irganox® 1010 are dissolved in 650.03 g of 2-butanone at 56° C. under nitrogen. 64.79 g (2 mol) of MDI are then metered in slowly. This is followed by the addition of 0.69 g of Tyzor AA105 (0.5% solution in Polyether LP 112, corresponding to 10 ppm). The reaction mixture is stirred for approximately 30 min and the temperature should be maintained at 60° C. Thereafter, 11.05 g (1.373 mol) of monoethylene glycol (MEG) are slowly added dropwise to the reaction mixture, and the mixture is stirred for a further 30-60 min at 60° C. Finally, 12.13 g (0.373 mol) of MDI are metered in at 60° C. and the mixture is stirred further at 60° C. until the NCO content no longer changes and hence a complete conversion can be assumed. Thereafter, the solvent 2-butanone is removed as far as possible by vacuum distillation.

TABLE 3

Results of Comparative Example 8 versus Example 6 according to the invention

| Experiment number | Process | Polyol | Chain Extended | MDI portion 1 [mol] | MDI portion 2 [mol] | Theoretical hardness | Solution viscosity | Tensile strength [MPa] |
|---|---|---|---|---|---|---|---|---|
| 8 | According to U.S. Pat. No. 3,915,923 | 1 | MEG | 2 | 0.373 | 16 | 1.054 | Processing not possible |
| 6 | 2 | 1 | MEG | 2 | 0.373 | 16 | 1.333 | 12 |

Experiment 8 was produced according to the process of U.S. Pat. No. 3,915,923. After addition of the chain extender, the mixture had to be stirred for 3 hours in order to obtain complete conversion/until a constant NCO content. After distilling off the solvent, the reaction mixture was nonetheless still highly viscous and not solid at room temperature. The reaction time was very long compared to the reaction time of the process according to the invention (maximum of 3 min). The product not according to the invention could not be processed thermoplastically in an injection moulding machine for further mechanical measurements due to the very low solution viscosity, corresponding to a low molecular weight, and due to the plasticity at room temperature, and is unusable for practical applications and especially for the claimed uses. The polyurethane polymer 6 according to the invention could be processed very well and is suitable for manifold applications, especially for the claimed uses and articles. The polyurethane polymer 6 according to the invention has a Shore hardness of 55A, determined according to DIN ISO 7619-1 (2012-02-01).

The invention claimed is:

1. A roller or a wheel, comprising: a thermoplastically processible polyurethane polymer having a hardness of ≤60 Shore A, obtained by reacting the following components
    (A) one or more essentially linear polyether polyols and/or polyester polyols, where a total amount of component (A) has an average molecular weight Mn in a range from 500 g/mol to 5000 g/mol, Mn having been calculated from an OH number determined according to DIN53240,
    (B) one or more diisocyanates comprising 2-methyl-1,5-diisocyanatopentane, 1,4-diisocyanatobutane (BDI), 1,5-diisocyanatopentane, 1,6-diisocyanatohexane, 2,2,4-trimethyl-1,6-diisocyanatohexane, 2,4,4-trimethyl-1,6-diisocyanatohexane, or diphenylmethane diisocyanate isomer mixtures having a diphenylmethane 4,4'-diisocyanate content of >96% by weight,
    (C) one or more linear diols having a molecular weight of 62 g/mol to 500 g/mol,
    (D) optionally in the presence of one or more catalysts,
    (E) optionally in the presence of one or more additives, auxiliaries additions, or a combination thereof, and
    (F) optionally in the presence of one or more monofunctional chain terminators,
    wherein the reaction is performed in a solvent-free fashion and comprises:
        1) providing and reacting a mixture made up of the total amount of component (A), a portion of component (B) and optionally a portion or a total amount of component (D), component (E), component (F), or a combination thereof to give an NCO-functional prepolymer, wherein there is an molar ratio of component (B) to component (A) in a range from 1.1:1.0 to 5.0:1.0,
        2) reacting the NCO-functional prepolymer with a total amount of component (C) to obtain an OH-functional prepolymer, optionally in the presence of a further portion of component (D), component (E), component (F), or a combination thereof,
        3) reacting the OH-functional prepolymer with a remaining amount of component (B) and any remaining amount of component (D), component (E), component (F), or a combination thereof to obtain a thermoplastically processible polyurethane, wherein during all process steps there is a molar ratio of component (B) to a sum total of component (A) and component (C) in a range from 0.9:1.0 to 1.2:1.0.

2. The roller or the wheel according to claim 1, wherein the roller or the wheel is part of a transport container, a suitcase, a sports bag, a leisure bag, a pannier, furniture, a medical device, a hospital bed, a shopping trolley, a lift, or an escalator.

3. The roller or the wheel according to claim 1, wherein the rollers or the wheel is a drive rollers or a pressure rollers.

4. The roller or wheel according to claim 1, wherein the polyurethane composition comprises an additive and is also plasticizer-free.

5. The roller or the wheel according to claim 4, wherein the roller or the wheel is part of a transport container, a suitcase, a sports bag, a leisure bag, a pannier, furniture, a medical device, a hospital bed, a shopping trolley, a lift, or an escalator.

6. The roller or the wheel according to claim 4, wherein the roller or the wheel is a drive roller.

7. A shoe sole, comprising a thermoplastically processible polyurethane polymer having a hardness of ≤60 Shore A, obtained by reacting the following components
    (A) one or more essentially linear polyether polyols and/or polyester polyols, where a total amount of component (A) has an average molecular weight Mn in a range from 500 g/mol to 5000 g/mol, Mn having been calculated from an OH number determined according to DIN53240,
    (B) one or more diisocyanates comprising 2-methyl-1,5-diisocyanatopentane, 1,4-diisocyanatobutane (BDI), 1,5-diisocyanatopentane, 1,6-diisocyanatohexane, 2,2,4-trimethyl-1,6-diisocyanatohexane, 2,4,4-trimethyl-1,6-diisocyanatohexane, or diphenylmethane diisocyanate isomer mixtures having a diphenylmethane 4,4'-diisocyanate content of >96% by weight,
    (C) one or more linear diols having a molecular weight of 62 g/mol to 500 g/mol,
    (D) optionally in the presence of one or more catalysts,
    (E) optionally in the presence of one or more additives, auxiliaries additions, or a combination thereof, and
    (F) optionally in the presence of one or more monofunctional chain terminators,
    wherein the reaction is performed in a solvent-free fashion and comprises:

1) providing and reacting a mixture made up of the total amount of component (A), a portion of component (B) and optionally a portion or a total amount of component (D), component (E), component (F), or a combination thereof to give an NCO-functional prepolymer, wherein there is a molar ratio of component (B) to component (A) in a range from 1.1:1.0 to 5.0:1.0, 2) reacting the NCO-functional prepolymer with a total amount of component (C) to obtain an OH-functional prepolymer, optionally in the presence of a further portion of component (D), component (E), component (F), or a combination thereof, 3) reacting the OH-functional prepolymer with a remaining amount of component (B) and any remaining amount of component (D), component (E), component (F), or a combination thereof to obtain a thermoplastically processible polyurethane, wherein during all process steps there is a molar ratio of component (B) to a sum total of component (A) and component (C) in a range from 0.9:1.0 to 1.2:1.0.

8. The shoe sole according to claim 7, wherein the shoe sole is a shoe outsole.

9. The shoe sole according to claim 7, wherein the polyurethane composition comprises an additive and is also plasticizer-free.

10. The shoe sole according to claim 9, wherein the shoe sole is a shoe outsole.

11. An elastic bearing element or an elastic connecting element, comprising a thermoplastically processible polyurethane polymer having a hardness of ≤60 Shore A, obtained by reacting the following components (A) one or more essentially linear polyether polyols and/or polyester polyols, where a total amount of component (A) has an average molecular weight Mn in a range from 500 g/mol to 5000 g/mol, Mn having been calculated from an OH number determined according to DIN53240, (B) one or more diisocyanates comprising 2-methyl-1,5-diisocyanatopentane, 1,4-diisocyanatobutane (BDI), 1,5-diisocyanatopentane, 1,6-diisocyanatohexane, 2,2,4-trimethyl-1,6-diisocyanatohexane, 2,4,4-trimethyl-1,6-diisocyanatohexane, or diphenylmethane diisocyanate isomer mixtures having a diphenylmethane 4,4'-diisocyanate content of >96% by weight, (C) one or more linear diols having a molecular weight of 62 g/mol to 500 g/mol, (D) optionally in the presence of one or more catalysts, (E) optionally in the presence of one or more additives, auxiliaries additions, or a combination thereof, and (F) optionally in the presence of one or more monofunctional chain terminators, wherein the reaction is performed in a solvent-free fashion and comprises:

1) providing and reacting a mixture made up of the total amount of component (A), a portion of component (B) and optionally a portion or a total amount of component (D), component (E), component (F), or a combination thereof to give an NCO-functional prepolymer, wherein there is a molar ratio of component (B) to component (A) in a range from 1.1:1.0 to 5.0:1.0, 2) reacting the NCO-functional prepolymer with a total amount of component (C) to obtain an OH-functional prepolymer, optionally in the presence of a further portion of component (D), component (E), component (F), or a combination thereof, 3) reacting the OH-functional prepolymer with a remaining amount of component (B) and any remaining amount of component (D), component (E), component (F), or a combination thereof to obtain a thermoplastically processible polyurethane, wherein during all process steps there is a molar ratio of component (B) to a sum total of component (A) and component (C) in a range from 0.9:1.0 to 1.2:1.0.

12. The elastic bearing element or an elastic connecting element according to claim 11, wherein the elastic bearing element or the elastic connecting element is a damper bearing, a spring seat, a door stop damper, or a bearing sleeve.

13. The elastic bearing element according to claim 11, wherein the polyurethane composition comprises an additive and is also plasticizer-free.

14. The elastic bearing element or the elastic connecting element according to claim 13, wherein the elastic bearing element or the elastic connecting element is a damper bearing, a spring seat, a door stop damper, or a bearing sleeve.

15. A component for automobile interiors, comprising a thermoplastically processible polyurethane polymer having a hardness of 60 Shore A, obtained by the components and process according to claim 1.

16. The component for automobile interiors according to claim 15, wherein the component for automobile interiors is part of a roller blind, a sliding cover, a louvre shutter, a cupholder, a gearshift cover, a storage compartment, a door handle, a charging cradle, an anti-slip mat, an injection-moulded gaiter, a blow-moulded gaiter, a flexible seal, a rotary switch, a pushbutton switch, or a door stop.

17. The component for automobile interiors according to claim 15, wherein the polyurethane composition comprises an additive and is also plasticizer-free.

18. The component for automobile interiors according claim 17, wherein the component for automobile interiors is part of a roller blind, a sliding cover, a louvre shutter, a cupholder, a gearshift cover, a storage compartment, a door handle, a charging cradle, an anti-slip mat, an injection-moulded gaiter, a blow-moulded gaiter, a flexible seal, a rotary switch, a pushbutton switch, or a door stop.

* * * * *